United States Patent [19]

Bashnin et al.

[11] 4,287,429
[45] Sep. 1, 1981

[54] APPARATUS FOR AUTOMATICALLY CONTROLLING THE ACTIVE POWER PRODUCED BY THE GENERATOR OF A HYDRAULIC TURBINE-GENERATOR UNIT

[76] Inventors: Oleg I. Bashnin, prospekt Maiorova, 53, kv. 13; Vasily V. Semenov, Moskovsky prospekt, 171, kv. 92; Vasily N. Fedorov, Prazhskaya ulitsa, 23, kv. 61; Evgeny I. Rodionov, prospekt Raevskogo, 8, kv. 21; Boris A. Davidson, prospekt Lunacharskogo, 70, korpus 4, kv. 140; Gleb S. Schegolev, Sinyavinskaya ulitsa, 12/49, kv. 29, all of Leningrad, U.S.S.R.

[21] Appl. No.: 62,034

[22] Filed: Jul. 30, 1979

[51] Int. Cl.³ .................. F01D 15/10; H02P 9/04
[52] U.S. Cl. ............................ 290/40 C; 290/52
[58] Field of Search .............. 290/40 C, 52; 318/621, 318/622; 322/19, 25

[56] References Cited

U.S. PATENT DOCUMENTS

| | | | |
|---|---|---|---|
| 2,605,451 | 7/1952 | Ward et al. | 318/621 |
| 3,077,557 | 2/1963 | Joline et al. | 318/621 |
| 3,184,667 | 5/1965 | Wallace | 318/621 |
| 3,246,220 | 4/1966 | Shinners | 318/621 |
| 3,895,280 | 7/1975 | Peterson | 318/621 |

FOREIGN PATENT DOCUMENTS 379013 4/1973 U.S.S.R.

OTHER PUBLICATIONS

Electric Governor for Hydraulic Turbines, Woodward Governor Co. Bulletin #07058.

Primary Examiner—J. V. Truhe
Assistant Examiner—Shelley Wade
Attorney, Agent, or Firm—Burgess, Ryan and Wayne

[57] ABSTRACT

An apparatus for automatically controlling the active power produced by the generator of a hydraulic turbine-generator unit, comprising a frequency-responsive summing means having its inputs respectively connected to a reference signal source which develops an assigned power signal, to a power measuring means responsive to the active power produced by the generator, and to a gate opening sensing means responsive to the degree of opening of the hydraulic turbine gate apparatus, and its output connected to a control means for controlling the degree of opening of the gate apparatus. The frequency-responsive summing means is adapted to develop at its output a signal representative of an algebraic sum of the signal applied to its input connected to the reference signal source, the low-frequency components of the signal applied to its input connected to the power measuring means and the high-frequency components of the signal applied to its input connected to the gate opening sensing means.

5 Claims, 3 Drawing Figures

APPARATUS FOR AUTOMATICALLY CONTROLLING THE ACTIVE POWER PRODUCED BY THE GENERATOR OF A HYDRAULIC TURBINE-GENERATOR UNIT

FIELD OF THE INVENTION

The present invention relates to apparatus for controlling hydroelectric plants, and more particularly to apparatus for automatically controlling the active power produced by the generator of a hydraulic turbine-generator unit.

The present invention can most advantageously be used in control systems for automatically controlling the frequency and power output of a hydroelectric unit or a group of hydroelectric units.

BACKGROUND OF THE INVENTION

Known in the art is an apparatus for automatically controlling the active power produced by the generator of a hydraulic turbine-generator unit, comprising a reference signal source for developing an assigned power signal, power measuring means responsive to the active power produced by the generator of the hydraulic turbine—generator unit, gate opening sensing means responsive to the degree of opening of the hydraulic turbine gate apparatus, gate opening control means for controlling the degree of opening of the gate apparatus, and an adder having its output connected to the gate opening control means, one of its inputs connected to the gate opening sensing means and its another input connected via a PID signal forming means and a second adder, to the reference signal source and to the power measuring means, the reference signal source and the power measuring means being connected to different inputs of the second adder. The PID signal forming means consists of an integrator, an amplifier and a differentiator connected in parallel (cf. Bulletin No. 07058 "Electric Governor for Hydraulic Turbines" of the Woodward Governor Company, p. 24, FIG. 25). Since the amplifier and the differentiator of the PID signal forming means have small amplification factors, the latter, in the frequency range corresponding to the bandwidth of the power control circuit, has a frequency response similar to that of an integrating element.

The proportional feedback between the gate opening sensing means and the gate opening control means in such a control apparatus makes it possible to avoid instability caused by the presence of two integrating circuits, one of which is the PID signal forming means and the other is the servomechanism of the gate opening control means.

Such a control apparatus, however, has a low response speed, which is due to the fact that the assigned power signal is applied to the gate opening control means via an integrating circuit.

To improve the response speed there was proposed an apparatus for automatically controlling the active power of the generator of a hydraulic turbine-generator unit, comprising a reference signal source for developing an assigned power signal, power measuring means responsive to the active power produced by the generator of the hydraulic turbine-generator unit, gate opening sensing means responsive to the degree of opening of the hydraulic turbine gate apparatus, gate opening control means for controlling the degree of opening of the hydraulic turbine gate apparatus, and frequency-responsive summing means having its inputs respectively connected to the reference signal source, to the power measuring means and to the gate opening sensing means, and its output connected to the gate opening control means so that a variation in a certain sense of the active power produced by the generator or of the degree of opening of the gate apparatus cause a variation of the signal at the output of the frequency-responsive summing means in the direction opposite to the variation of said signal caused by a variation of the assigned power in the same sense, wherein the frequency-responsive summing means comprises an integrator having one of its inputs connected to the reference signal source and another of its outputs connected to the power measuring means, and an adder having its inputs respectively connected to the reference signal source, to the output of the integrator and to the gate opening sensing means, and its output connected to the gate opening control means (cf. the U.S.S.R. Author's Certificate No. 379,013).

The control apparatus has two closed control circuits, wherein the assigned power signal is respectively compared with the signal corresponding to the actual active power produced by the generator and with the signal corresponding to the degree of opening of the gate apparatus. The first control circuit has a slow response, which is due to the presence of the integrator, the latter being necessary for preventing the gates of the gate apparatus from movement with the swings of the generator power output which take place in the course of operation of a generator connected to a power system and for preventing the generator power output from falling or rising when a connection or a disconnection of consumer loads occurs. The second control circuit has a quick response and makes it possible to avoid instability caused by the presence in the control apparatus of two integrating circuits, one of which is the integrator of the first control circuit and the other is the servomechanism controlling the degree of opening of the gate apparatus.

In this control apparatus the signal corresponding to the assigned power is applied to the input of the adder not only through the integrator but also directly. As a result, change in the assigned power signal first brings into operation the quick response control circuit comprising the gate opening sensing means, whereupon the generator power output is corrected by the slow response control circuit comprising the power measuring means. In this manner a more rapid response of the control apparatus is provided without a reduction in static control accuracy.

In this case, however, the response speed of the control apparatus also remains relatively low. This is due to the fact that a change in the assigned power signal leads to the appearance of a voltage at the integrator input, as a result of which, the integrator output voltage immediately begins to grow. The growth of the voltage at the output of the integrator continues until the actual generator power output attains the assigned value. The integrator output signal passes to the input of the adder and is added to the assigned power signal. As a result of this, the gate opening control means moves the gates of the gate apparatus to a position corresponding to the steady-state generator power output exceeding the assigned value. The return of the gate apparatus to the position corresponding to the assigned power value occurs when the signal at the integrator output goes down, i.e., after the actual power produced by the generator has risen above the assigned value. Thus, in the course of operation of the control apparatus an overshooting takes place causing a dynamic error. This error is the greater, the smaller is the time constant of the integrator. Therefore the time constant of the integrator is such a control apparatus is chosen sufficiently great so that the dynamic error might not exceed the admissible value and usually amounts to several tens of seconds. Such a great time constant, however, leads to a lower response speed of the control apparatus.

SUMMARY OF THE INVENTION

Accordingly, it is an object of the present invention to provide an apparatus for automatically controlling the active power produced by a generator of a hydraulic turbine-generator unit, which has a high response speed.

It is another object of the present invention to provide an apparatus for automatically controlling the active power produced by a generator of a hydraulic turbine-generators unit, which ensures a quick setting of the hydraulic turbine gate apparatus to a position corresponding to the assigned power without a reduction in static control accuracy and with small overshooting.

The principal object of the present invention is to provide an apparatus for automatically controlling the active power produced by a generator of a hydraulic turbine-generator unit, wherein the application of the feedback signals corresponding to the active power produced by the generator and to the degree of opening of the hydraulic turbine gate apparatus is carried out in such a way as to ensure a quick setting of the gate apparatus to a position corresponding to the assigned power without a reduction in static control accuracy and with little overshoot.

With this and other objects in view there is proposed an apparatus for automatically controlling the active power produced by the generator of a hydraulic turbine-generator unit, comprising a reference signal source for developing an assigned power signal, a power measuring means responsive to the active power produced by the generator of the hydraulic turbine-generator unit, a gate opening sensing means responsive to the degree of opening of the hydraulic turbine gate apparatus, a gate opening control means for controlling the degree of opening of the hydraulic turbine gate apparatus, and a frequency-responsive summing means having its inputs respectively connected to the reference signal source, to the power measuring means and to the gate opening sensing means, and its output connected to the gate opening control means so that a variation in a certain sense of the actual active power produced by the generator or of the degree of opening of the gate apparatus causes a variation of the signal at the output of the frequency-responsive summing means in the direction opposite to the variation of said signal caused by a variation of the assigned power in the same sense, wherein, according to the invention, the frequency-responsive summing means has a frequency response $$Y = K_1 \frac{1}{1 + j\omega T_1} X_1 + K_2 \frac{j\omega T_2}{1 + j\omega T_2} X_2 + K_3 X_3, \quad (1)$$

where
Y is the signal at the output of the frequency-responsive summing means,
$K_1$, $K_2$, $K_3$ are amplification factors independent of frequency,
$j = \sqrt{-1}$
$\omega$ is frequency,
$T_1$, $T_2$ are time constants independent of frequency,
$X_1$ is the signal at the input of the frequency-responsive summing means, connected to the power measuring means,
$X_2$ is the signal at the input of the frequency-responsive summing means, connected to the gate opening sensing means,
$X_3$ is the signal at the input of the frequency-responsive summing means, connected to the reference signal source.

Such a frequency response enables the frequency-responsive summing means to suppress the high-frequency components of the signal applied to its input connected to the power measuring means, and the low-frequency components of the signal applied to its input connected to the gate opening sensing means, and to develop at the output of the frequency-responsive summing means a signal representative of an algebraic sum of the assigned power signal, the low-frequency components of the signal corresponding to the actual active power produced by the generator, and the high-frequency components of the signal corresponding to the degree of opening of the gate apparatus.

In the proposed control apparatus the signal corresponding to the deviation of the actual active power produced by the generator from the assigned value is first compared in the summing means with the signal supplied from the gate opening sensing means, as a result of which, the gates of the gate apparatus begin to move quickly toward a position corresponding to the assigned power, thus ensuring a stable operation of the control apparatus. The variation of the signal supplied to the summing means from the power measuring means in the initial stage has a small effect on the signal at the output of the summing means thanks to suppression of the high-frequency components of this signal. In process of time the signal component at the output of the summing means caused by the signal from the gate opening sensing means goes down and the signal component at the output of the summing means caused by the signal from the power measuring means goes up until the signal from the power measuring means completely replaces, as a signal to be compared with the assigned power signal, the signal from the gate opening sensing means. This ensures the setting of the gate apparatus to a position at which the actual active power produced by the generator coincides to a high degree of accuracy with the assigned power.

In this case there is no integration of the difference between the assigned and actual power values in the initial stage and, consequently, the dynamic error caused by such an integration does not arise. Therefore the minimum values of the time constants $T_1$ and $T_2$ are limited only by necessity to ensure stability of the control system. This allows to choose small time constants $T_1$ and $T_2$ and thus to provide a quick setting of the gate apparatus to the position corresponding to the assigned power without reducing the static control accuracy and with small overshooting. Thereby a high response speed of the control apparatus is achieved.

To attain the frequency response specified above the frequency-responsive summing means may comprise an adder, one of the inputs of the adder being the input of the frequency-responsive summing means connected to the reference signal source, and the output of the adder being the output of the frequency-responsive summing means, a low-pass filter having its output connected to another input of the adder, the input of the low-pass filter being the input of the frequency-responsive summing means, connected to the power measuring means, and a high-pass filter having its output connected to a third input of the adder, the input of the high-pass filter being the input of the frequency-responsive summing means, connected to the gate opening sensing means.

To further increase the response speed of the control apparatus it is expedient that the frequency-responsive summing means be made so that the summed components of the signal applied to its input, connected to the power measuring means have the same frequencies as the suppressed components of the signal applied to its input connected to the gate opening sensing means, and the summed components of the signal applied to its input connected to the gate opening sensing means have the same frequencies as the suppressed components of the signal applied to its input, connected to the power measuring means, i.e., so that the frequency-responsive summing means has such a frequency response at which the time constants $T_1$ and $T_2$ are equal to each other.

To further increase the response speed of the control apparatus it is expedient that the frequency-responsive summing means have such a frequency response at which the time constants $T_1$ and $T_2$ are equal to each other.

This permits a reduction in the signal oscillations at the output of the frequency-responsive summing means arising with variations of the signals supplied to its inputs from the power measuring means and the gate opening sensing means, especially when the optimum values of the amplification factors $K_1$ and $K_2$ provided for these signals are chosen, i.e., when, in the course of operation of the control apparatus, these amplification factors ensure as small a divergence between the products $K_1X_1$ and $K_2X_2$ as possible. The reduction of the signal oscillations at the output of the summing means allows to increase the response speed of the control apparatus.

The aforementioned equality of the frequencies of the summed and suppressed signal components may be achieved by having the low-pass and high-pass filters made so that their cut-off frequencies are equal to each other.

The aforementioned equality of the time constants may be achieved by having the low-pass and high-pass filters made so that their cut-off frequencies are equal to each other.

According to another embodiment of the invention the frequency-responsive summing means may comprise an adder, one of the inputs of the adder being the input of the frequency-responsive summing means, connected to the reference signal source, and the output of the adder being the output of the frequency-responsive summing means, a second adder, one of the inputs of the second adder being the input of the frequency-responsive summing means, connected to the gate opening sensing means, and the output of the second adder being connected to another input of the first adder, and an integrator having one of its inputs and its output, respectively, connected to the output and to another input of the second adder so as to form a negative feedback circuit connected across the second adder, another input of the integrator being the input of the frequency-responsive summing means, connected to the power measuring means.

The frequency-responsive summing means made according to this embodiment of the invention ensures the aforementioned equality between the frequencies of the suppressed and the summed components.

The frequency-responsive summing means made according to this embodiment of the invention ensures the aforementioned equality of the time constants $T_1$ and $T_2$.

Besides, the summing means made in such a way makes it possible to change equally and simultaneously the time constants of the input signal transmission circuits by the adjustment of the same element of the integrator. This facilitates the adjustment of the time constants of the summing means when they should remain equal to each other.

It is expedient that the control apparatus comprise a high-pass filter connected between the gate opening sensing means and one of the inputs of an adder connected between the power measuring means and the input of the frequency-responsive summing means connected thereto so that another input of the adder is connected to the power measuring means, and the output of the adder is connected to the input of the frequency-responsive summing means.

This allows, by suitably choosing the time constant of said high-pass filter, to provide compensation for the time lag with which the signal corresponding to the generator steady-state power output appears at the input of the summing means, connected to the power measuring means. This time lag is caused by water hammer arising with a change in position of the gate apparatus and, to a lesser degree, by the presence of the low-pass filter in the power measuring means. The compensation for this time lag ensures a substantial reduction in variations of the difference between the signals appearing at the inputs of the summing means, connected to the power measuring means and to the gate opening sensing means during operation of the control apparatus. This allows for smaller oscillations at the output of the summing means and thus provides a faster response of the control apparatus.

In addition, the compensation of this time lag adds to the stability of the control system and thus makes it possible to reduce the time constants $T_1$ and $T_2$ and to increase thereby the response speed of the control apparatus or to extend their adjustment range toward smaller values and facilitate thereby the adjustment of the control apparatus.

The relationship between the degree of opening of the gate apparatus and the generator steady-state power output corresponding to this opening in the operating control range may substantially differ from the proportional law. Therefore, to provide a closer agreement between the waveforms at the inputs of the summing means, connected to the power measuring means and to the gate opening sensing means, the proposed control apparatus may comprise a function generator reproducing the law of variation of the active power produced by the generator during steady state operation as a function of the degree of opening of the gate apparatus, and connected between the gate opening sensing means and the input of the frequency-responsive summing means connected thereto so that the input of the function generator is connected to the gate opening sensing means, and the output of the function generator is connected to the input of the frequency-responsive summing means.

By this means the signal oscillations at the output of the summing means are reduced and thereby a more rapid response of the control apparatus is achieved.

As is well known, a power output corresponding to a given degree of opening of the gate apparatus depends upon a hydrostatic head acting on the runner of the hydraulic turbine.

Therefore, the proposed control apparatus may comprise a function generator reproducing the law of variation of the active power produced by the generator during steady state operation as a function of the degree of opening of the gate apparatus and of the hydrostatic head acting on the runner of the hydraulic turbine and connected between the gate opening sensing means, and the input of the frequency-responsive summing means connected thereto, so that one of the inputs of the function generator is connected to the gate opening sensing means and the output of the function generator is connected to the input of the frequency-responsive summing means, and a head sensing means responsive to the hydrostatic head acting on the runner of the hydraulic turbine and connected to another input of the function generator.

Owing to the provision of the function generator hooked into the circuit it becomes possible to eliminate the difference between the signals supplied to the inputs of the summing means from the power measuring means and the gate opening sensing means, which difference is caused by variations in the head and tail water levels, and thus to provide a more rapid response of the control apparatus. It is particularly expedient to employ this function generator in the apparatuses for controlling generators of hydroelectric plants having relatively small water-storage basins.

These and other objects and advantages of the present invention will become more apparent upon consideration of the following detailed description of its preferred embodiments taken in conjunction with the accompanying drawings, wherein:

BRIEF DESCRIPTION OF THE DRAWINGS

The invention is further explained by a detailed description of its embodiments with reference to the accompanying drawings, in which.

DETAILED DESCRIPTION OF THE INVENTION

Figure 1:
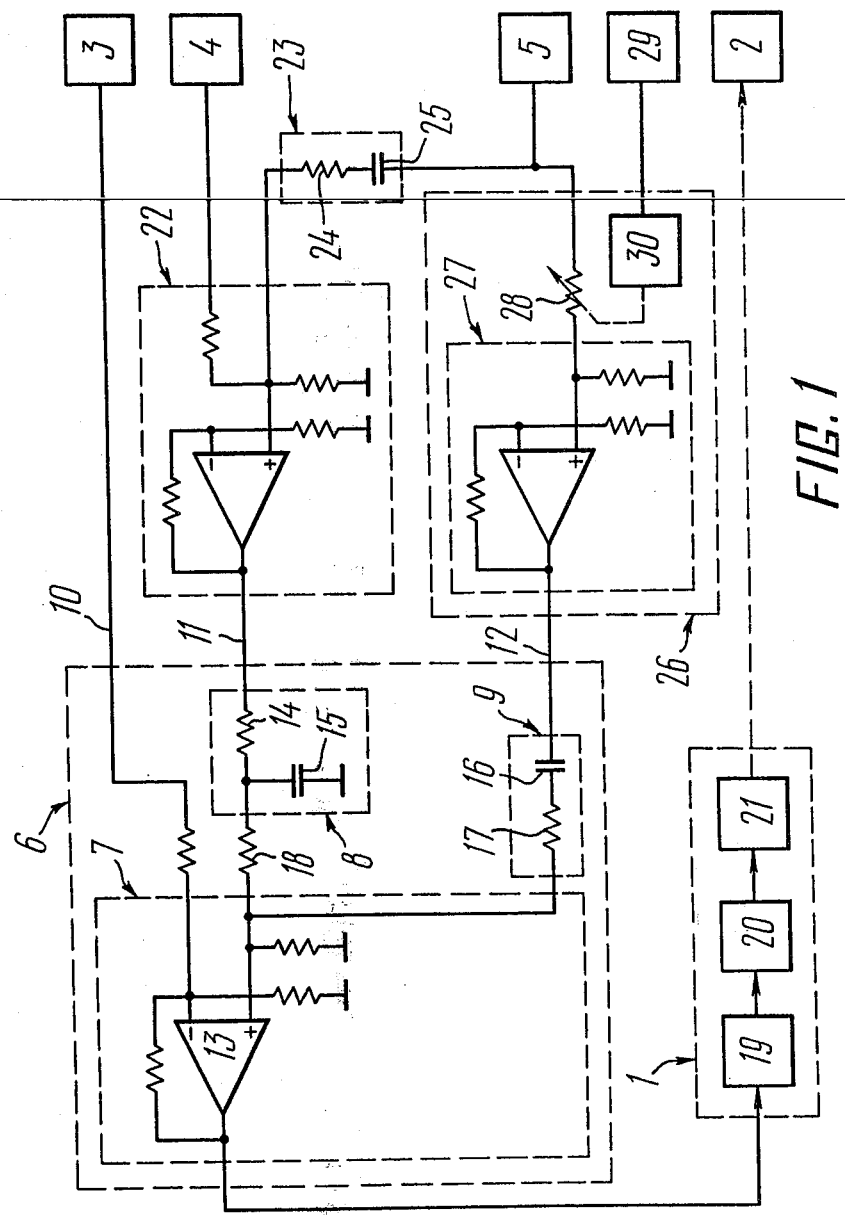
FIG. 1 is a block-diagram of an apparatus for automatically controlling the active power produced by a generator of a hydraulic turbine-generator unit, according to the invention.

According to FIG. 1 the apparatus for automatically controlling the active power produced by the generator (not shown) of a hydraulic turbine-generator unit (not shown) comprises a gate opening control means 1 for controlling the degree of opening of a hydraulic turbine gate apparatus 2, a reference signal source 3, a power measuring means or transducer 4, a gate opening sensing means 5 and a frequency-responsive summing means 6 having its output connected to the input of the gate opening control means 1.

The reference signal source 3 develops a signal proportional to an assigned power value. The reference signal source 3 may be made as a potentiometer fed by a stabilized direct voltage.

The power measuring means 4 develops a signal proportional to the actual active power produced by the generator of the hydraulic turbine-generator unit. The power measuring means 4 may be made as a measuring circuit comprising current and voltage transformers coupled to the generator output bars, multiplying devices having their inputs connected to corresponding transformers, an adder having its inputs connected to the outputs of the multiplying devices and a low-pass filter having its input connected to the output of the adder, the low-pass filter being adapted to smooth the voltage pulsations caused by assymmetrical loading of the generator phases.

The gate opening sensing means 5 develops a signal proportional to the degree of opening of the hydraulic turbine gate apparatus 2. The gate opening sensing means 5 may be made as a potentiometer mechanically connected to the rod (not shown) actuating the gates (not shown) of the gate apparatus 2.

The signals developed by the source 3, the measuring means 4 and the sensing means 5 are of the same polarity.

The frequency-responsive summing means 6 comprises an adder 7, whose output is the output of the summing means 6, a low-pass filter 8 and a high-pass filter 9 having their outputs connected to respective inputs of the adder 7 whose third input constitutes the input 10 of the summing means 6 and is connected to the reference signal source 3. The other inputs 11 and 12 of the summing means 6 are the input of the low-pass filter 8 and the input of the high-pass filter 9, respectively. The adder 7 comprises a differential amplifier 13 having its inverting input connected to the reference signal source 3, and its non-inverting input connected to the outputs of the filters 8 and 9. The low-pass filter 8 comprises a resistor 14 and a capacitor 15 connected in series, the capacitor 15 being connected across the output of the filter 8. The high-pass filter 9 comprises a resistor 16 and a capacitor 17 connected in series. A decoupling resistor 18 is connected between the low-pass filter 8 and the non-inverting input of the differential amplifier 13.

The gate opening control means 1 is adapted to change the position of the gates of the gate apparatus 2 in accordance with the signal applied to the input of the control means 1 and comprises an electrohydraulic converter 19, whose input is the input of the control means 1, a hydraulic amplifier 20 and a hydraulic actuator 21 adapted for driving the gates of the gate apparatus 2.

According to one of the embodiments of the present invention, the inputs 11 and 12 of the summing means 6 are directly connected to the power measuring means 4 and to the gate opening sensing means 5.

According to another embodiment of the invention, the control apparatus comprises an adder 22 connected between the power measuring means 4 and the input 11 of the summing means 6, and a high-pass filter or differentiator 23, the latter including a resistor 24 and a capacitor 25 connected in series between the gate opening sensing means 5 and one of the inputs of the adder 22. The adder 22 has its other input connected to the power measuring means 4, while its output is connected to the input 11 of the summing means 6.

According to still another embodiment of the invention, the control apparatus comprises a function generator 26 connected between the gate opening sensing means 5 and the input 12 of the summing means 6. The function generator 26 comprises a decoupling amplifier 27, whose output constitutes the output of the function generator 26 and is connected to the input 12 of the summing means 6, and a resistor 28. One terminal of the resistor 28 is connected to the non-inverting input of the amplifier 27, and the other terminal of the resistor 28 constitutes the input of the function generator 26 and is connected to the gate opening sensing means 5.

According to one of the embodiments of the invention, the resistor 28 is a non-linear resistor having its resistance dependent on the voltage applied thereto.

According to another embodiment of the invention, the control apparatus comprises head sensing means 29 adapted for developing a signal proportional to the hydrostatic head acting on the runner (not shown) of the hydraulic turbine (not shown), the resistor 28 is a variable linear resistor and the function generator 26 comprises a control device 30 for varying the resistance of the resistor 28 in accordance with the signal at the input of the control device 30. The input of the control device 30 constitutes the other input of the function generator 26 and is connected to the head sensing means 29. The resistor 28 may be a potentiometer and the control device 30 may be a servomechanism setting the movable contact of the potentiometer to a position corresponding to the signal supplied from the head sensing means 29.

The head sensing means 29 may comprise a water level measuring means (not shown) adapted for measuring the head and tail water levels and a subtraction circuit (not shown) having its inputs connected to the water level measuring means.

The signal developed by the head sensing means 29 is of the same polarity as the signals developed by the source 3, the measuring means 4 and the sensing means 5.

During steady state operation, when the actual active power produced by the generator of the hydraulic turbine-generator unit is equal to the assigned value, the signals proportional to the degree of opening of the gate apparatus 2 and to the head do not appear at the inputs of the adder 7 owing to the provision of the series capacitors 16 and 25 of the high-pass filters 9 and 23. The signal proportional to the active power is applied via the low-pass filter 8 to the input of the adder 7, another input of the adder 7 being supplied with a signal proportional to the assigned power fed from the reference signal source 3. The adder 7 provides subtraction of these signals. The amplification factors for the signals supplied to the inputs of the adder 7 are chosen so that during steady state operation and with the actual power being equal to the assigned value the output voltage of the adder 7 is zero.

If an increase or a reduction in the generator power output is required, the signal supplied from the source 3 to the input 10 of the frequency-responsive summing means 6, i.e., to the input of the adder 7, is increased or reduced, respectively, whereby a signal appears at the output of the adder 7 (and of the summing means 6) which is proportional to the change in the signal at the input 10. The signal at the output of the summing means 6 is shown in the FIG. 2a.

This signal is applied to the input of the electrohydraulic converter 19 (FIG. 1) which produces a corresponding change of pressure at its output. This change is amplified by the hydraulic amplifier 20, whereby the hydraulic actuator 21 is set in motion and moves the gates of the gate apparatus 2 so as to increase the degree of opening of the gate apparatus 2 if the polarity of the output signal of the summing means 6 corresponds to increase in the assigned power or to reduce the degree of opening of the gate apparatus 2 if the polarity of the output signal of the summing means 6 corresponds to reduction in the assigned power.

The speed of the hydraulic actuator 21 is limited by the maximum permissible speed of the gates, which is chosen so as to avoid a drastic increase in the pressure in the penstock (not shown) of the hydraulic turbine caused by water hammer.

Therefore, when a substantial change in the assigned power occurs, the variation of the degree of opening of the gate apparatus 2 in the initial stage proceeds at a constant rate. The variation of the degree of opening of the gate apparatus 2 is shown in FIG. 2b.

This variation brings about a variation in the active power produced by the generator. Because of water hammer arising when the gates of the gate apparatus 2 change their position, a corresponding variation of power accompanying the variation of the degree of opening of the gate apparatus 2, does not take place immediately but occurs with a certain time lag depending on the quantity and velocity of the water in the penstock.

Assuming that the active power produced by the generator during steady state operation within the operating control range varies proportionally to variation in the degree of opening of the gate apparatus, and neglecting the swings in the generator power output occurring in the course of operation of a generator connected to a power system, it is possible to approximate the law of variation of the power as a function of the variation of the degree of opening of the gate apparatus by the following expression:

$$N(j\omega) = b_1 Z(j\omega) - b_2 \frac{j\omega T_h}{1 + j\omega T_h} Z(j\omega), \quad (2)$$

where
$N(j\omega)$ is the active power produced by the generator,
$j = \sqrt{-1}$,
$\omega$ is frequency,
$b_1$, $b_2$, $T_h$ are constant factors independent of frequency and defined by a hydraulic turbine-generator unit design,
$Z(j\omega)$ is the degree of opening of the gate apparatus.

The first term in the right-hand part of the equation (2) represents the active power produced by the generator at a given degree of opening of the gate apparatus during steady state operation, while the second term represents the deviation caused by water hammer of the instantaneous power from the steady-state value.

The variation of the active power produced by the generator is shown in FIG. 2c.

At first we consider the operation of the control apparatus wherein the power measuring means 4 (FIG. 1) is directly connected to the input 11 of the summing means 6, and the gate opening sensing means 5 is directly connected to the input 12. Variations of the signal at the output of the summing means 6, of the degree of opening of the gate apparatus 2 and of the generator power output are shown by solid lines in FIGS. 2a, 2b and 2c. The signal at the input 12 (FIG. 1) of the summing means 6 in this case varies in proportion to the degree of opening of the gate apparatus 2 as shown by a solid line in FIG. 2d, and the signal at the input 11 (FIG. 1) varies in proportion to the generator power output as shown by a solid line in FIG. 2e.

The frequency-responsive summing means 6 (FIG. 1), thanks to the presence of the filters 8 and 9, provides suppression of the high-frequency components of the signal applied to its input 11, and of the low-frequency components of the signal applied to its input 12 and develops at its output a signal representative of the difference between the signal applied to its input 10 and the sum of the low-frequency components of the signal applied to its input 11 and the high-frequency components applied to its input 12. The frequency response of the summing means 6 conforms to the expression (1), wherein:

Y is the signal at the output of the summing means 6, $K_1$, $K_2$ are the amplification factors, of like sign, provided by the summing means 6 for the signals at its inputs 11 and 12, respectively, $K_3$ is the amplification factor provided by the summing means 6 for the signal at its input 10, opposite in sign to the factors $K_1$ and $K_2$, $T_1$, $T_2$ are time constants respectively determined by the cut-off frequencies of the filters 8 and 9, $X_1$, $X_2$, $X_3$ are, respectively, the signals applied to the inputs 11, 12, and 10 of the summing means 6.

Since the variation of the degree of opening of the gate apparatus 2 in the initial stage proceeds at a constant rate, the signal at the output of the high-pass filter 9 and the signal component at the output of the summing means 6, proportional thereto and equal to $$K_2 \frac{j\omega T_2}{1 + j\omega T_2} X_2$$

have constant values at this stage. The variation of the output signal of the high-pass filter 9 and of the aforementioned signal component at the output of the summing means 6, in case the power measuring means 4 and the gate opening sensing means 5 are directly connected to the inputs 11 and 12, is shown by a solid line in FIG. 2f. The signal at the output of the low-pass filter 8 and the signal component at the output of the summing means 6, proportional thereto and equal to $$K_1 \frac{1}{1 + j\omega T_1} X_1$$

vary with a certain time lag relative to the generator power output. Their variation in this case is shown by a solid line in FIG. 2g.

The signal at the output of the summing means 6 (FIG. 1) represents the difference between the component proportional to the signal supplied to its input 10 from the reference signal source 3 and the sum of the aforementioned components proportional to the output signals of the filters 8 and 9. As the gates of the gate apparatus 2 move, the output signal of the summing means 6 decreases (see FIG. 2a), first as a result of the appearance of the signal at the output of the high-pass filter 9 (FIG. 1), and then as a result of the increase of the signal at the output of the low-pass filter 8. When the output signal of the summing means 6 falls below a certain limit, the speed of the actuator 21 begins to decrease in proportion this signal.

This causes a reduction in the rate of change of the signal produced by the gate opening sensing means 5 and hence, the drop in the signal at the output of the high-pass filter 9 and in the component proportional to said signal at the output of the summing means 6. When the gates of the gate apparatus 2 come to a halt, they occupy a position at which the generator steady-state power output is equal to the assigned value. With the gates of the gate apparatus 2 remaining stationary the output signal of the high-pass filter 9 is zero, while the output signal of the low-pass filter 8 is proportional to the signal produced by the power measuring means 4 and fully counter-balances the signal supplied from the reference signal source 3, thereby providing the setting of the gate apparatus 2 to a position at which the actual active power produced by the generator coincides to a high degree of accuracy with the assigned power.

The high-pass filter 9 prevents instability arising as a result of the delay in variation of the signal at the output of the low-pass filter 8 relative to variation of the position of the gate apparatus 2.

The minimum values of the time constants $T_1$ and $T_2$ entering into the expression 1 for the frequency response of the summing means 6 are limited only by the requirements on stability of the control system. This makes it possible to choose low cut-off frequencies of the filters 8 and 9 and thus to provide relatively small values of the time constants and a high response speed of the control apparatus. With water inertia time determined by inertia of the water in the penstock being 3 to 4 seconds, the time constants $T_1$ and $T_2$ may be about 15 seconds.

Figure 2:
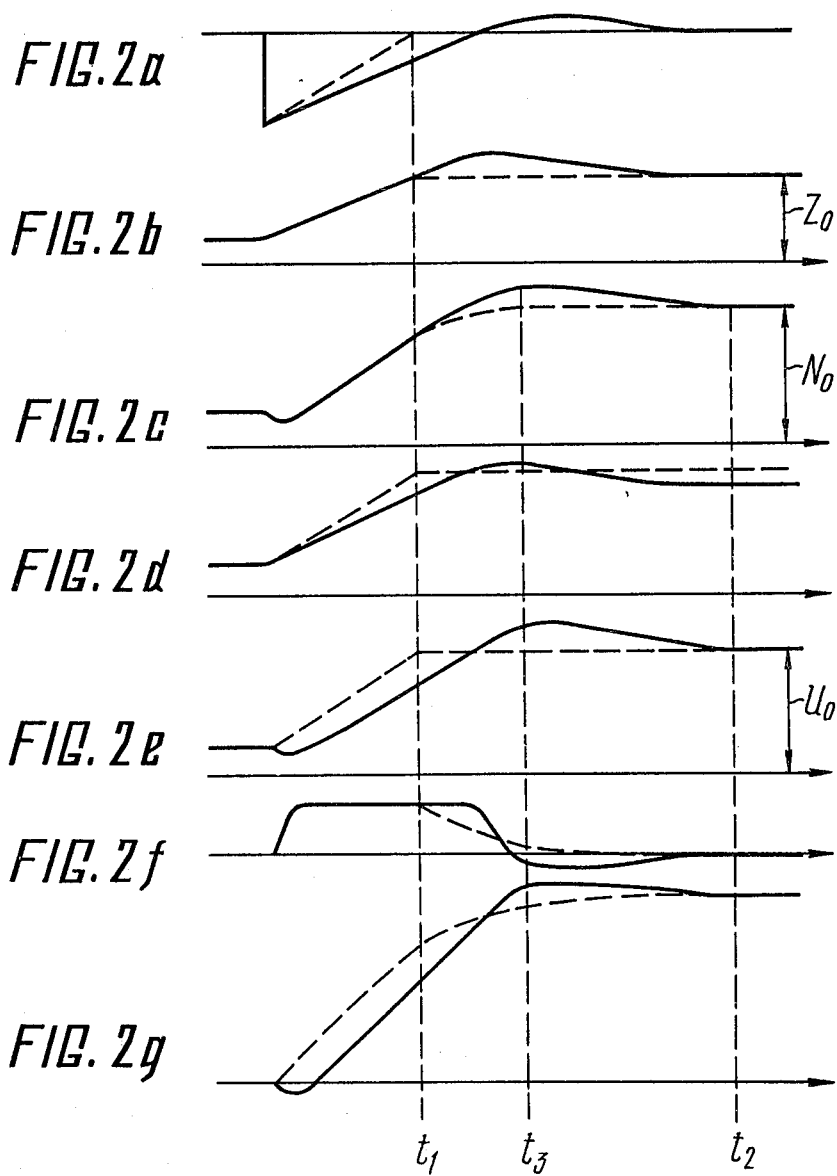
FIG. 2 (a–g) shows curves characterizing variations of the degree of opening of the gate apparatus and of the active power produced by the generator, as well as of signal waveforms obtained at various positions of the control apparatus.

According to FIG. 2 the gate apparatus 2 (FIG. 1) attains the opening degree $Z_o$ (FIG. 2b), at which the active power produced by the generator during steady state operation is equal to the assigned value, at time $t_1$. However, the movement of the gates of the gate apparatus 2 (FIG. 1) will, as a rule, continue also after this time, which is due to the following causes.

As pointed out above, variation of the generator power output occurs with a time lag relative to variation of the degree of opening of the gate apparatus 2, because of water hammer. Besides, variation of the signal produced by the power measuring means 4 is somewhat delayed relative to actual variation of power, the delay being due to the presence of the low-pass filter in the power measuring means 4. Therefore, if the power measuring means 4 and the gate opening sensing means 5 are directly connected to the inputs 11 and 12, respectively, the signal at the input 11 will continue to vary after time $t_1$ (the solid line in FIG. 2e), whereby the signal at the output of the summing means 6 (FIG. 1) also varies causing the movement of the gates of the gate apparatus 2. If the control apparatus is so designed that in steady state, i.e., when the gate apparatus is in a fixed position, the signal produced by the power measuring means 4 causes approximately the same variation of the signal at the output of the summing means 6 as does the signal produced by the gate opening sensing means 5 (which may be achieved if the signals produced in steady state by the measuring means 4 and the sensing means 5 are approximately the same and the amplification factors $K_1$ and $K_2$ are equal to each other), the sum of the signal components at the output of the summing means 6 caused by the signals at its inputs 11 and 12 at time t₁ (FIG. 2), due to the time lag, will be smaller than the signal component at the output of the summing means 6 (FIG. 1) caused by the signal at its input 10. In this case, if the control apparatus circuit provides for the travelling of the gates of the gate apparatus 2 at the maximum speed up to time t₁ (FIG. 2), the movement of the gates will also continue after this time causing overshooting, as shown by the solid lines in FIG. 2. Such overshooting prolongs the transient process reducing thereby the response speed of the control apparatus, as can be seen from FIG. 2, wherein the time of termination of the transient process is designated as t₂ and the values assumed by the degree of opening of the gate apparatus 2 (FIG. 1), by the generator power output and by the signal produced by the power measuring means 4 after the end of the transient process are respectively designated as $Z_o$, $N_o$ and $U_o$ (FIG. 2).

It is possible to avoid overshooting by increasing the signal from the gate opening sensing means 5 (FIG. 1) or the amplification factor $K_2$. However, elimination of the overshooting in this event is achieved at the cost of a slower movement of the gates of the gate apparatus 2, which, like overshooting, leads to reduction in the response speed.

Besides, the relationship between the degree of opening of the gate apparatus 2 and the generator steady-state power output corresponding to this opening in the operating control range may be substantially differ from the proportional law. In this case at different parts of the control range different rates of change of the generator power output will correspond to the same rate of change in the degree of opening of the gate apparatus 2. Hence, owing to an increased or a decreased rate of change of the generator power output, the signal supplied to the input 12 of the summing means 6 from the gate opening sensing means 5 at time t₁ (FIG. 2) will differ from the optimum value, i.e., from the value ensuring the highest response speed. If the signal at the input 12 (FIG. 1) at time t₁ (FIG. 2) is below the optimum value, this will lead to increase in overshooting; if it is above the optimum value, this will lead to a slower movement of the gate apparatus 2 (FIG. 1). In both cases a deviation of the aforementioned signal from the optimum value leads to a prolonged transient process, and thus to a lower response speed of the control apparatus.

The generator power output depends upon the hydrostatic head acting on the runner of the hydraulic turbine. Head variations occuring in the course of operation of the hydraulic turbine result in the fact that at different instants different rates of change of the generator power output will correspond to the same rate of change of opening of the gate apparatus 2. As a consequence, the signal supplied to the input 12 of the summing means 6 from the gate opening sensing means 5 at time t₁ (FIG. 2) will vary with head variations and will deviate from the optimum value, which, as pointed out above, leads to a prolonged transient process and to a lower response speed of the control apparatus.

Aside from the circumstances described hereinbefore and related to the design and the working conditions of the hydroelectric unit, the response speed is also affected by the choice of the time constants $T_1$ and $T_2$, i.e., of the suppressed and the summed components of the signals at the inputs 11 and 12 (FIG. 1) of the summing means 6.

The expression 1 can be rewritten as follows:

$$Y = \frac{1}{1 + j\omega T_1} K_1 X_1 + \frac{j\omega T_1}{1 + j\omega T_1} K_2 X_2 + K_3 X_3 + \quad (3)$$

$$\left( \frac{j\omega T_2}{1 + j\omega T_2} - \frac{j\omega T_1}{1 + j\omega T_1} \right) K_2 X_2.$$

The first three terms in the right-hand part of the equation (3) represent the variation of the signal at the output of the summing means 6 when the time constant $T_1$ is equal to the time constant $T_2$. The fourth term in the right-hand part of the equation (3) represents the signal component at the output of the summing means 6, causing an additional variation of this signal at the output of the summing means 6 due to inequality of the time constants $T_1$ and $T_2$. Therefore, with the time constants $T_1$ and $T_2$ being equal, the oscillations of the signal at the output of the summing means 6 resulting from the variation of the signals at its inputs 11 and 12 will generally be smaller than with the time constants $T_1$ and $T_2$ being different. Since a reduction in the signal oscillations at the output of the summing means 6 provides for a shorter transient process, the control apparatus will generally have a greater response speed when the time constants $T_1$ and $T_2$ are equal to each other, i.e., when the frequencies of the summed and suppressed components of the signal applied to the input 11 are respectively equal to the frequencies of the suppressed and summed components of the signal applied to the input 12.

To provide equality of the time constants $T_1$ and $T_2$ the values of the resistors 14 and 17 as well as of the capacitors 15 and 16 are chosen so that the cut-off frequency of the low-pass filter 8 is equal to the cut-off frequency of the high-pass filter 9.

It will be also seen from the expression 3 that, with the time constants $T_1$ and $T_2$ being equal, the variation of the signal component at the output of the summing means 6 caused by the summing of the signal components at its inputs 11 and 12 the less differs from the signal variations at its inputs 11 and 12, the less is the difference between the products $K_1 X_1$ and $K_2 X_2$, and, if $K_1 X_1 = K_2 X_2$, said signal component at the output of the summing means 6 is similar in waveform to the signals at its inputs 11 and 12. Therefore, to attain more rapid response of the control apparatus, the amplification factors $K_1$ and $K_2$ should be chosen so as to provide, during operation of the control apparatus, as small divergence between the products $K_1 X_1$ and $K_2 X_2$ as possible.

If the control apparatus comprises the adder 22 and the high-pass filter 23 connected as shown in FIG. 1, the input 11 of the summing means 6 and of the low-pass filter 8 is supplied, in addition to the signal produced by the power measuring means 4, with the high-frequency components of the signal produced by the gate opening sensing means 5. The high-pass filter 23 has a frequency response $$V = K_4 \frac{j\omega T_3}{1 + j\omega T_3} W, \quad (4)$$

where

V is the signal at the output of the high-pass filter 23,
$K_4$ is an amplification factor independent of frequency, $T_3$ is a time constant independent of frequency and determined by the cut-off frequency of the filter 23, $\omega$ is the signal produced by the gate opening sensing means 5 and applied to the input of the filter 23.

The values of the resistor 24 and of the capacitor 25 are chosen so that the cut-off frequency of the high-pass filter 23 is such that the time constant $T_3$ is equal to the factor $T_h$ entering into the expression 2. In this case the variation of the signal supplied from the gate opening sensing means 5 via the filter 23 to the input of the adder 22 will be similar to variation of the aforementioned term entering into the expression 2 and representing the deviation of the instantaneous power, caused by water hammer. This allows, with the proper choice of the amplification factors provided for the signals applied to the inputs of the adder 22, to compensate for the deviation of the signal from the power measuring means 4, caused by the aforementioned deviation of the instantaneous power.

The amplification factor provided by the adder 22 for the signal from the power measuring means 4 is unity. The amplification factor provided by the adder 22 for the signal from the gate opening sensing means 5 has a value which ensures compensation for said deviation of the signal produced by the power measuring means 4. In such a case the input 11 of the summing means 6 is supplied with a sum of the signals, one of which comes from the power measuring means 4 and the other comes from the gate opening sensing means 5 via the filter 23 and the adder 22. The signal supplied to the input 11 from the gate opening sensing means 5 compensates for the deviation of the instantaneous power, caused by water hammer, whereby the total signal at the input 11 corresponds not to the actual power produced by the generator at a given moment, but to that power which would have been produced by the generator under steady state conditions with the gates of the gate apparatus 2 being in the same position which they occupy at this moment. In this way the power signal delay caused by the water hammer is avoided, which, in turn, permits to avoid overshooting caused by this time delay without slowing the gates of the gate apparatus 2 and to increase thereby the response speed of the control apparatus.

Besides, elimination of this time delay adds to the stability of the control system and lowers the minimum admissible value of the time constant $T_1$ entering into the expression 1 (and hence of the time constant $T_2$). The minimum values of the time constants in this case are limited only by the necessity to eliminate movement of the gates of the gate apparatus 2 with the swings of the generator power output which take place in the course of operation of the generator when it is connected to a power system, and to prevent the generator output from rising or falling when a connection or a disconnection of consumer loads occurs. This allows either to reduce the time constants $T_1$ and $T_2$ and attain thereby a further increase in the response speed, or to extend their adjustment range toward smaller values and facilitate thereby the adjustment of the control apparatus.

As noted above, the variation of the signal produced by the power measuring means 4 is somewhat delayed relative to actual power variation. If necessary, this time delay can be eliminated by an appropriate increase in an amplification factor of the signal applied to the input of the adder 22, connected to the gate opening sensing means 5.

The function generator 26 which is connected between the gate opening sensing means 5 and the input 12 of the summing means 6 and wherein the resistor 28 is a nonlinear resistor having its resistance dependent on the voltage applied thereto is used when the relationship between the degree of opening of the gate apparatus 2 and the generator steady-state power output in the operating control range substantially differs from the proportional law. The resistor 28 is chosen so as to ensure the relationship between its resistance and the voltage similar to the relationship between the ratio of the active power produced by the generator during steady state operation to the degree of opening of the gate apparatus 2 and the degree of opening of the gate apparatus 2. In this case the function generator 26 reproduces the law of variation of the active power produced by the generator during steady state operation in the function of the degree of opening of the gate apparatus 2. The signal at the input 12 of the summing means 6 will vary in proportion not to the degree of opening of the gate apparatus 2, but to the power which would have been produced by the generator during steady state operation at a given degree of opening of the gate apparatus 2. Consequently, an increase or a decrease in the rate of change of the power output caused by nonlinearity of the relationship between the power output and the degree of opening of the gate apparatus 2 will be accompanied by a proportional increase or decrease in the rafte of change of the signal at the input 12. As a result, the signal applied to the input 12 at time $t_1$ (FIG. 2), when the gate apparatus 2 (FIG. 1) attains a position at which the generator steady-state power output is equal to the assigned value, will not be affected by said variations in the rate of change of the power output, caused by nonlinearity. With the proper choice of the amplification factor provided by the amplifier 27, this allows to establish an optimum, from the viewpoint of the response speed, ratio between the signal $U_o$ (FIG. 2e) applied to the input II (FIG. 1) after the termination of the transient process and the signal applied to the input 12 at time $t_1$ (FIG. 2), this ratio remaining the same regardless of the portion of the nonlinear relationship between the power output and the degree of opening of the gate apparatus 2 (FIG. 1) to which the assigned power value corresponds.

The function generator 26 wherein the resistor 28 is a variable linear resistor whose resistance varies in accordance with the signal fed from the head sensing means 29 is used when the relationship between the generator steady-state power output and the degree of opening of the gate apparatus 2 is linear, but the head acting on the runner of the turbine varies in the course of operation of the hydroelectric unit. As a rule, the generator steady-state power output varies in proportion to head variation. Therefore the resistor 28 and the control device 30 are so designed that the resistance of the resistor 28 varies in proportion to a change in the signal produced by the head sensing means 29. In this case the function generator 26 reproduces the law of variation of the active power produced by the generator during steady state operation in the function of the degree of opening of the gate apparatus 2 and the head acting on the runner of the turbine, while the signal at the input 12 of the summing means 6 varies in proportion to the active power produced by the generator during steady state operation at a given degree of opening of the gate apparatus 2 with due regard for the head variations. Consequently, an increase or a decrease in the rate of change of the power output caused by head variations will be accomplished by a proportional increase or decrease in the rate of change of the signal at the input 12. This allows with the proper choice of the amplification provided by the amplifier 27, to establish an optimum, from the viewpoint of the response speed, ratio between a signal $U_o$ (FIG. 2e) applied to the input 11 (FIG. 1) after the termination of the transient process and the signal applied to the input 12 at time $t_f$ (FIG. 2), this ratio remaining the same regardless of changes in the head acting on the runner of the hydraulic turbine.

The function generator 26 may consist of other circuits which provide the required relationship between its output and input signals. Such circuits are widely used in analogue computers and may comprise, e.g., back-biased diodes or integrated circuits providing multiplication of the input signals. Such circuits can be used when it is necessary to reproduce more complicated relationships between the power output, the opening of the gate apparatus and the head, e.g., when the head is changeable and the power output in the operating control range varies as a substantially nonlinear function of the opening of the gate apparatus or of the head (or of both of them).

The relation of the steady-state power output to the head and to the opening of the gate apparatus can be easily obtained from the known turbine characteristics.

Now we consider the operation of the control apparatus comprising the high-pass filter 23 and the adder 22, which provide compensation for the power signal delay, and the function generator 26 which provides compensation for head variations and for nonlinearity of the power variation in relation to the degree of opening of the gate apparatus 2, with the frequency-responsive summing means 6 having a frequency response wherein the time constants $T_1$ and $T_2$ are equal to each other. If the amplification factors $K_1$ and $K_2$ are also equal, the amplification factors of the adder 22 and of the amplifier 27 are chosen as to provide equality between the signal applied to the input 12 at time $t_1$ (FIG. 2) and the signal applied to the input 11 (FIG. 1) after the termination of the transient process.

Upon the change in the assigned power and the appearance of the voltage at the output of the summing means 6 the variation of the degree of opening of the gate apparatus 2 in the initial stage proceeds at a constant rate as shown by the solid line in FIG. 2b. The variation of the generator output will be delayed as shown in FIG. 2c. The signal at the input 11 (FIG. 1), however, thanks to the signal supplied via the high-pass filter 23 from the gate opening sensing means 5, will correspond not to the actual power output, but to that, which would have been produced in steady state and will, therefore, vary without a time lag, as shown by a dashed line in FIG. 2e. The signal component at the output of the summing means 6 (FIG. 1) produced by the low-frequency components of the signal at the input 11 will vary, as shown by a dashed line in FIG. 2g.

The time $t_1$ when the gate apparatus 2 (FIG. 1) attains the position $Z_o$ (FIG. 2b), at which the power produced by the generator in steady state would have been equal to the assigned value, is determined by the rate of change of the generator power output upon the movement of the gates of the gate apparatus 2. This rate of change, in turn, depends on the head and, in case of a nonlinear relation between the power and the opening of the gate apparatus 2 (FIG. 1), also on the assigned power. At time $t_1$ (FIG. 2) the signal at the input 11 (FIG. 1) will correspond to the power which would have been produced by the generator during steady state operation, i.e., will have the value $U_o$ (FIG. 2e) which corresponds to the assigned power. Thanks to the function generator 26 (FIG. 1), the signal at the input 12 will correspond not to the degree of opening of the gate apparatus 2 but, just as the signal at the input 11, to the power which would have been produced by the generator at this degree of opening of the gate apparatus 2 during steady state operation. With the amplification factors of the adder 22 and of the amplifier 27 being chosen as stated above, the signal at the input 12 will vary in the same way as the signal at the input 11, and at time $t_1$ (FIG. 2) will be equal to $U_o$.

The signal component at the output of the summing means 6 (FIG. 1) caused by the high-frequency components of the signal at the input 12 will vary as shown by a dashed line in FIG. 2f. Because of equality of the signals at the inputs 11 and 12 (FIG. 1), of the amplification factors $K_1$ and $K_2$, as well as of the time constants $T_1$ and $T_2$, the suppressed high-frequency components of the signal at the input 11 (FIG. 1) are wholly compensated for by the high-frequency components of the signal at the input 12 and the suppressed low-frequency components of the signal at the input 12 are wholly compensated for by the low-frequency components of the signal at the input 11. Therefore the sum of the signal components at the output of the summing means 6 caused by the signals at the inputs 11 and 12 at time $t_1$ (FIG. 2) is equal to $KU_o$, where $K=K_1=K_2$, i.e., is equal to the value which occurs after the termination of the transient process. As a result, the signal at the output of the summing means 6 (FIG. 1) at time $t_1$ (FIG. 2) is zero. The variation of this signal is shown by a dashed line in FIG. 2a.

Thus, at time $t_1$ (FIG. 2) the movement of the gates of the gate apparatus 2 (FIG. 1) and hence the variation of the signal at the input 12 will cease. Because of the time lag, the variation of the generator power output will continue as shown by a dashed line in FIG. 2c. This variation of power, however, does not cause variation in the signal at the input 11 (FIG. 1) since it will be compensated for by the signal from the high-pass filter 23. Owing to cessation of the variations in the signal at the input 11, the rate of change of the signal component corresponding thereto at the output of the summing means 6 gradually descends to zero after time $t_1$ as shown by the dashed line in FIG. 2g. At the same time, owing to cessation of the variations in the signal at the input 12 (FIG. 1), the signal component corresponding thereto at the output of the summing means 6 also gradually descends to zero as shown by the dashed line in FIG. 2f. Because of equality of the time constants $T_1$ and $T_2$ the variations of these components wholly compensate for each other so that the signal at the output of the summing means 6 remains zero as shown in FIG. 2a. Therefore, after time $t_f$ the gate apparatus 2 (FIG. 1) remains stationary as shown by the dashed line in FIG. 2b, and the generator power output attains the steady-state value $N_o$, equal to the assigned power, at time $t_3$, i.e., considerably earlier than time $t_2$.

The dashed lines shown in FIG. 2 will also correspond to operation of the control apparatus which comprises the high-pass filter 23 (FIG. 1) and the adder 22 but does not include the function generator 26 provided that the generator steady-state power output varies in proportion to the degree of opening of the gate apparatus 2 and that the head acting on the turbine runner does not change during operation.

In actual practice, owing to impossiblity of the absolute compensation for all the factors affecting the transient response, the signals at the inputs 11 and 12 of the summing means 6 will not be exactly the same and will not exactly correspond to the generator steady-state power output. This may lead to a slight displacement of the gates of the gate apparatus 2 after time $t_1$ (FIG. 2), which ensure a close agreement between the signals produced by the power measuring means 4 (FIG. 1) and by the reference signal source 3.

With a change in the generator load, e.g., with a connection or a disconnection of the consumer loads, the active power produced by the generator deviates from the mechanical power developed by the turbine, which leads to a corresponding variation in the signal produced by the power measuring means 4. However, thanks to suppression of the high-frequency components of the signal supplied from the measuring means 4 to the input 11 of the summing means 6, this will not put in motion the gates of the gate apparatus 2 immediately after the change in the generator active power occurred. As a result of this, the speed governing system (not shown), which controls the rotational speed of the hydraulic turbine and responds to the change in speed caused by the deviation of the active power from the mechanical power, will have time to change the assigned power value preventing thereby the gates of the gate apparatus 2 from travelling in the wrong direction.

The swings of the generator power output, which take place in the course of operation of the generator connected to a power system (not shown) will also be prevented from passing through the low-pass filter 8 and therefore will not cause displacement of the gates.

Figure 3:
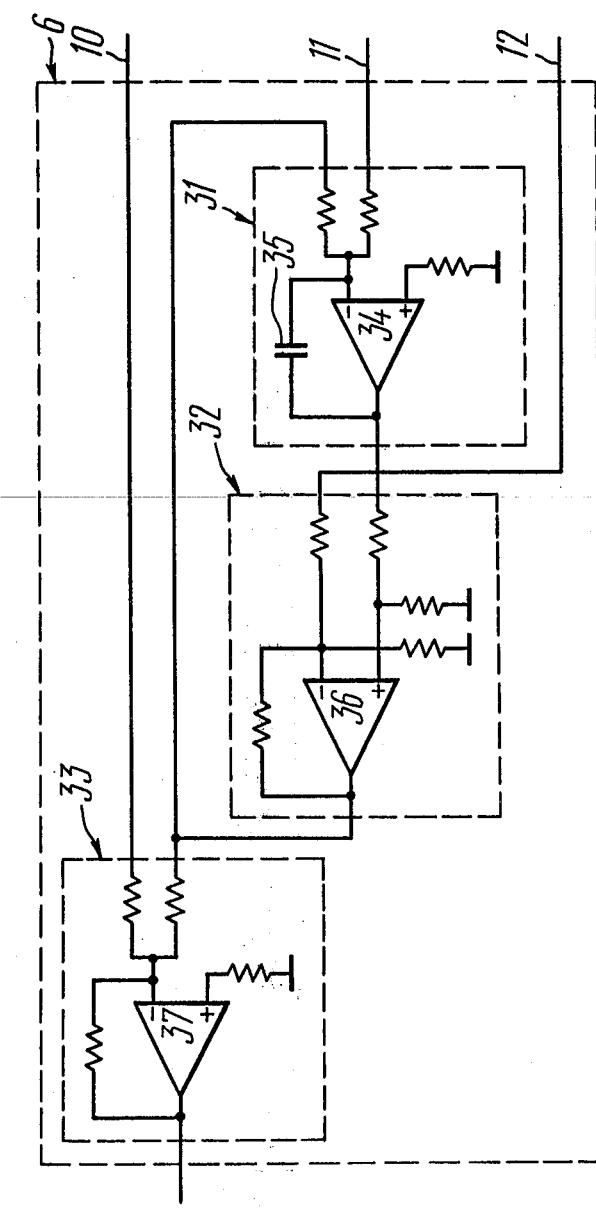
FIG. 3 is a block-diagram of the frequency-responsive summing means according to one of the embodiments of the invention.

FIG. 3 shows another embodiment of the frequency-responsive summing means 6. According to FIG. 3 the frequency-responsive summing means 6 comprises an integrator 31 and adders 32 and 33. One of the inputs of the integrator 31 is the input 11 of the summing means 6, the other input of the integrator 31 is connected to the output of the adder 32. One of the inputs of the adder 31 is the input 12 of the summing means 6, the other input of the adder 32 is connected to the output of the integrator 31. One of the inputs of the adder 33 is the input 10 of the summing means 6, the other input of the adder 33 is connected to the output of the adder 32. The output of the adder 33 is the output of the summing means 6.

The integrator 31 comprises a differential amplifier 34 and a negative feedback circuit including a capacitor 35 connected across the differential amplifier 34. The adders 32 and 33 comprise differential amplifiers 36 and 37, respectively. The differential amplifiers 34, 36 and 37 are connected so that the signals applied to the inputs 10, 11 and 12 of the summing means 6 are respectively fed to the inverting input of the differential amplifier 3, to the inverting input of the differential amplifier 34 and to the inverting input of the differential amplifier 37. The signal from the output of the differential amplifier 34 is fed to the non-inverting input of the differential amplifier 36, whose output signal is fed to the inverting inputs of the differential amplifiers 34 and 37. Thus a negative feedback path is provided across the adder 32 via the integrator 31.

The frequency response of the summing means 6 shown in FIG. 3 corresponds to the expression 1, wherein:

$T_1 = T_2 = T_5/K_5,$ $K_1 = K_7(T_5/T_4),$ $K_2 = K_6 K_7,$ $K_3 = K_8,$ where
- $T_4$ is the integration constant provided by the integrator 30 for the signal at its input which is the input 11 of the summing means 6,
- $T_5$ is the integration constant provided by the integrator 30 for the signal at its input connected to the output connected to the output of the adder 31, $K_5$ is the amplification factor provided by the amplifier 31 for the signal at its input connected to the output of the integrator 30,
- $K_6$ is the amplification factor provided by the amplifier 31 for the signal at its input which is the input 12 of the summing means 6,
- $K_7$ is the amplification factor provided by the amplifier 32 for the signal at its input connected to the output of the adder 31,
- $K_8$ is the amplification factor provided by the amplifier 32 for the signal at its input which is the input 10 of the summing means 6.

Therefore, if the summing means 6 composed according to FIG. 3 is used instead of the summing means 6 composed according to FIG. 1, the variation of the signal at the output of the adder 32 (FIG. 3) will be similar to that which would have taken place at the output of the adder 13 (FIG. 1) if the summing means 6 composed according to FIG. 1 had been used wherein the cut-off frequencies of the filters 8 and 9 are equal to each other and the values of the amplification factors $K_1$, $K_2$ and $K_3$ and of the time constants $T_1$ and $T_2$, which define the frequency response, are equal to the respective values defining the frequency response of the summing means 6 composed according to FIG. 3.

If the inputs 11 and 12 of the summing means 6 shown in FIG. 3 are supplied with the signals coming directly from the power measuring means 4 (FIG. 1) and the gate opening sensing means 5, respectively, the summing means 6 shown in FIG. 3 operates as follows.

After the gates of the gate apparatus 2 (FIG. 1) began to move, the variation of the signal at the output of the adder 31 (FIG. 3) and hence at the output of the adder 33 at first is determined mainly by the signal supplied to the input 12 from the gate opening sensing means 5 (FIG. 1), which is due to the presence of the integrator 3 (FIG. 3) connected between the input 11 to which the signal from the power measuring means 4 (FIG. 1) is applied and the adder 32 (FIG. 3). Then, as the integration of the signals applied to the inputs of the integrator 31 proceeds, the signal component at the output of the adder 32 caused by the signal from the gate opening sensing means 5 (FIG. 1) will gradually decrease owing to the negative feedback signal supplied via the integrator 31 (FIG. 3) from the output of the adder 31 to its input. At the same time the signal component at the output of the adder 32 caused by the signal at the input 11 will gradually increase. After the termination of the transient process the signal at the output of the adder 32 will be determined entirely by the signal at the input 11, i.e., by the signal from the power measuring means 4 (FIG. 1) corresponding to the actual active power produced by the generator. As this takes place, a signal is developed at the output of the integrator 31 (FIG. 3), which is determined by the difference between the signals produced by the power measuring means 4 (FIG. 1) and the gate opening sensing means 5. In this way the high-frequency components of the signal applied to the input 11 (FIG. 3) of the summing means 6 are suppressed, as well as the low-frequency components of the signal applied to the input 12. With the inverting and non-inverting inputs of the differential amplifiers 34, 36 and 37 connected as described above, the summing means 6 produces at its output a signal representative of the difference between the signal at its input 10 and a sum of the low-frequency components of the signal at its input 11 and the high-frequency components of the signal at its input 12.

If the inputs 11 and 12 of the summing means 6 shown in FIG. 3 are supplied with equal signals from the adder 22 (FIG. 1) and the amplifier 27, respectively, and the summing means 6 has a frequency response wherein $K_1=K_2$ (i.e., $K_6=T_5/T_4$), the signal supplied to the input of the integrator 31 from the adder 22 (FIG. 1) will be counter-balanced by the negative feedback signal applied to the input of the integrator (FIG. 3) from the output of the adder 32. Therefore, with the signals at the inputs 11 and 12 being identical, there will be no integration in the integrator 31. However, because of the difference between the signals at the inputs 11 and 12 which takes place in practice, the integrator 31 will develop at its output a small signal to provide a close agreement between the signals produced by the power measuring means 4 (FIG. 1) and by the reference signal source 3 after the termination of the transient process.

The summing means 6 shown in FIG. 3 makes it possible to change equally and simultaneously the time constants $T_1$ and $T_2$ by means of adjustment of the same element, namely, the capacitor 35 of the integrator 31. As this adjustment takes place, the amplification factors $K_1$, $K_2$ and $K_3$ do not change. This facilitates the setting of the time constants $T_1$ and $T_2$ when it is necessary to keep them equal to each other, e.g., during the adjustment of the control apparatus according to the characteristics of the hydroelectric unit and to the working conditions.

The frequency response of the summing mean 6 corresponding to the expression 1 may be attained with the inverting and non-inverting inputs of the integrator 31 and the adders 32 and 33 connected in some other way provided that the application of the negative feedback signal is secured from the output of the adder 31 to the input of the integrator 31.

If the control apparatus circuit shown in FIG. 1 comprises the summing means 6 composed as shown in FIG. 3, the adder 22 (FIG. 1) may be incorporated into the integrator 31 (FIG. 3), which in this case has a third input connected to the high-pass filter 23 (FIG. 1). The resistor 28 of the function generator 26 may be directly connected to that input of the adder 32 (FIG. 3) which constitutes the input 12 of the summing means 6.

While the invention is described herein in the terms of the preferred embodiments, numerous modifications may be made without departure from the spirit and scope of the invention as defined in the appended claims.

Thus, other embodiments of the frequency-responsive summing means can be used which provide suppression of the high-frequency components of the signal at one of its inputs and of the low-frequency components of the signal at another of its inputs.

Other embodiments of the frequency-responsive summing means can be used which provide a frequency response corresponding to the expression 1.

E.g., the frequency-responsive summing means may comprise a high-pass or low-pass filter and two adders connected in such a way that the output of one of the adders is connected via the filter to one of the inputs of the second adder, whose output is the output of the summing means. When the high-pass filter is used, the other input of the second adder is supplied with the signal from the power measuring means, and the inverting and non-inverting inputs of the other adder are respectively supplied with the signals from the power measuring means and the gate opening sensing means. When the low-pass filter is used, the other input of the second adder is supplied with the signal from the gate opening sensing means and the inverting and non-inverting inputs of the other adder are respectively supplied with the signals from the gate opening sensing means and the power measuring means.

What is claimed is:

1. An apparatus for automatically controlling the active power produced by a generator of a unit including a generator and a hydraulic turbine having a gate for controlling water flow to the runner of the hydraulic turbine, said apparatus comprising:
    means for providing a reference signal corresponding to a desired power level;
    an active power measuring means to measure the power developed by said generator;
    a gate opening sensing means responsive to the extent of opening of said gate;
    a gate opening control means for adjusting the extent of opening of said gate;
    a first summing means having two inputs and an output, a first of said inputs of said first summing means being coupled to said reference signal providing means, and said output of said first summing means being coupled to said gate opening control means;
    a second summing means having two inputs and an output, a first of said inputs of said second summing means being coupled to said gate opening sensing means, and said output of said second summing means being coupled to the second of said inputs of said first summing means; and
    an integrator having two inputs and an output, a first of said inputs and said output of said integrator being coupled, respectively, to said output and second of said inputs of said second summing means so as to form a negative feedback circuit comprising said second summing means, and the second of said inputs of said integrator being coupled to said active power measuring means.

2. An apparatus as claimed in claim 1, further comprising:
    a third summing means coupled between said active power measuring means and said second input of said integrator and having two inputs and an output, one of said inputs of said third summing means being coupled to said active power measuring means, and said output of said third summing means being coupled to said second input of said integrator; and
    a high-frequency filter coupled between said gate opening sensing means and the second of said inputs of said third summing means.

3. An apparatus as claimed in claim 1, further comprising:
 a function generator having a characteristic corresponding to the variation of the active power produced by the generator during steady-state operation as a function of the extent of opening of the gate and the hydraulic head acting on the runner of the hydraulic turbine, said function generator being coupled between said gate opening sensing means and said first input of said second summing means and having two inputs and an output, one of said inputs of said function generator being coupled to said gate opening sensing means, and said output of said function generator being coupled to said first input of said second summing means; and
 a hydrostatic head sensing means responsive to the head acting on the runner of the hydraulic unit turbine and coupled to the second of said inputs of said function generator.

4. An apparatus as claimed in claim 3, further comprising:
 a third summing means coupled between said active power measuring means and said second input of said integrator and having two inputs and an output, one of said inputs of said third summing means being coupled to said active power measuring means, and said output of said third summing means being coupled to said second input of said integrator; and
 a high-frequency filter coupled between said gate opening sensing means and the second of said inputs of said third summing means.

5. Apparatus according to claim 1 or 2 or 3 or 4, wherein said first summing means, said second summing means and said integrator have a combined frequency response given by $$Y = K_1 \frac{1}{1 + j\omega T_1} X_1 + K_2 \frac{j\omega T_2}{1 + j\omega T_2} X_2 + K_3 X_3$$

where
 Y is the signal at the output of said first summing means,
 $K_1$, $K_2$, $K_3$ are amplification factors independent of frequency,
 $\omega$ is the angular frequency,
 $T_1$, $T_2$ are time constants independent of frequency,
 $X_1$ is the signal at the second input of the integrator,
 $X_2$ is the signal at the first input of said second summing means, and
 $X_3$ is the signal at the first input of said first summing means.

* * * * *